Sept. 30, 1969   J. E. BISLEW   3,469,472
TRANSMISSION CONTROL
Filed Jan. 26, 1967   2 Sheets-Sheet 1

INVENTOR.
John E. Bislew
BY
WILSON, SETTLE, BATCHELDER
ATT'YS. & CRAIG.

United States Patent Office 3,469,472
Patented Sept. 30, 1969

3,469,472
TRANSMISSION CONTROL
John E. Bislew, Racine, Wis., assignor to J. I. Case Company, Racine, Wis., a corporation of Wisconsin
Filed Jan. 26, 1967, Ser. No. 612,013
Int. Cl. F16h 3/08, 37/00; F16d 67/04
U.S. Cl. 74—761                                15 Claims

ABSTRACT OF THE DISCLOSURE

A vehicle transmission having a main speed range unit combined with a hydraulic transmission unit for varying the speed in any range. A valve system is provided for regulating the hydraulic unit and includes a modulating valve for "inching" or stopping the vehicle in any range and a foot pedal control for automatically conditioning the hydraulic unit in the slowest forward speed of the range after stopping or "inching."

BACKGROUND OF THE INVENTION

Figure 1:
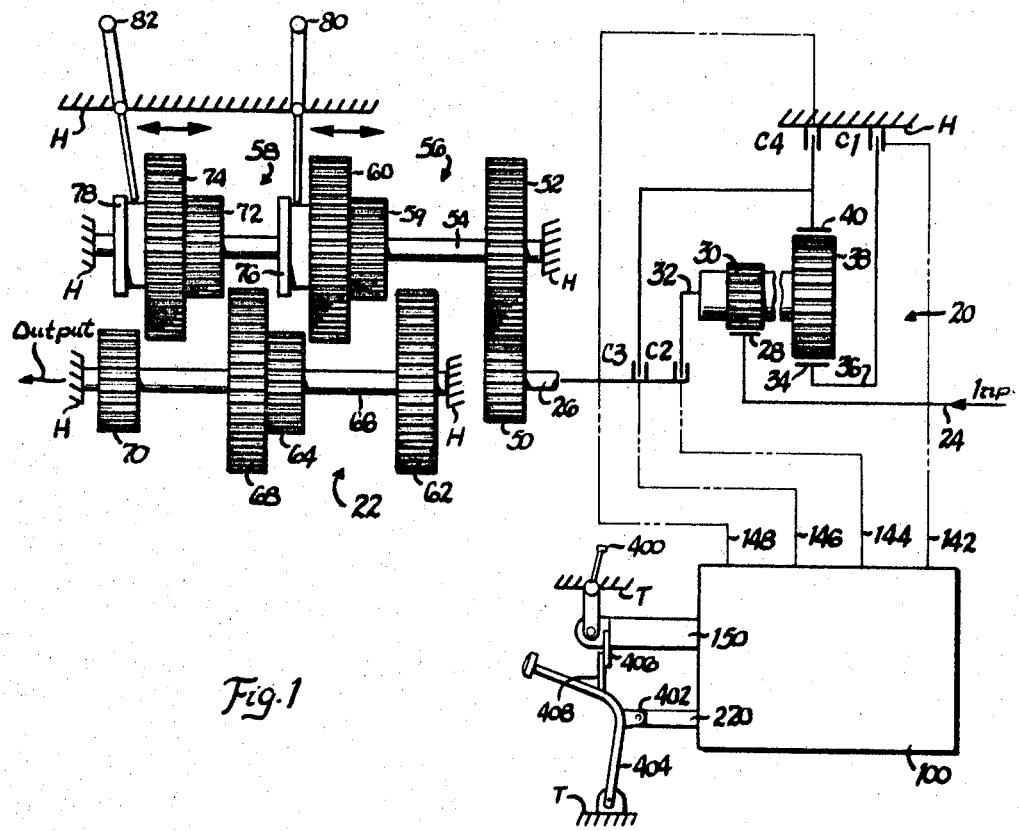

The present invention relates generally to transmissions and more particularly to an improved transmission control system for a multiple-speed power-shift transmission.

Transmissions normally employed in heavy duty vehicles, such as agricultural and light industrial tractors, often require that the transmission be capable of being operated at a plurality of fixed ground speeds. Present day transmissions are being designed to provide increased number of ground speeds so that the vehicle is more versatile and capable of being used in all types of agricultural and other operations.

One type of transmission, which has shown partial success in producing the desired end, is a combined multiple speed planetary drive unit and a multiple speed sliding gear unit. In this type of transmission unit it is customary to provide a control lever for the sliding gear or range changing unit and a hydraulic control system for the planetary drive or speed changing unit.

SUMMARY

Generally speaking, the hydraulic control system of the invention is particularly adapted for use in a transmission having a planetary speed changing unit, which is illustratively shown as a unit having three forward speeds and one reverse speed, combined with a range changing unit. The control system or valve control group includes a plurality of spring biased hydraulically operated spool valves, a pair of which must be activated to produce any given output speed from the planetary drive unit. A charging pressure is supplied to each of the spool valves and a modulating valve is operatively interposed between the pressure source and one of the spool valves which must be engaged for the low forward and reverse speeds. A selector valve is provided to selectively actuate the respective pairs of spool valves for each of the given speeds, and a reverse lockout valve means is provided to eliminate inadvertent shifting to the reverse speed while the transmission is being operated in a forward speed.

The primary object of the present invention is to provide a control system for a transmission having a plurality of selectable speed ranges and with means for changing the speed in any given selected range.

Another object is to provide a transmission control system which is capable of providing controlled engagement of the transmission resulting in a varying output speed of the transmission unit.

A further object is to provide a hydraulic control for a combined mechanical and hydraulic multispeed transmission unit which is capable of being "inched" in any selected mechanical speed.

A still further object is to provide a combined mechanically shiftable and hydraulically actuatable multiple speed transmission unit, the output of which may be progressively increased or decreased in any manually selected speed by a simple manual manipulation and without declutching.

Still another object is to provide a hydraulic control system for a transmission unit which is capable of producing a smooth transition from one speed to another.

Figure 3:
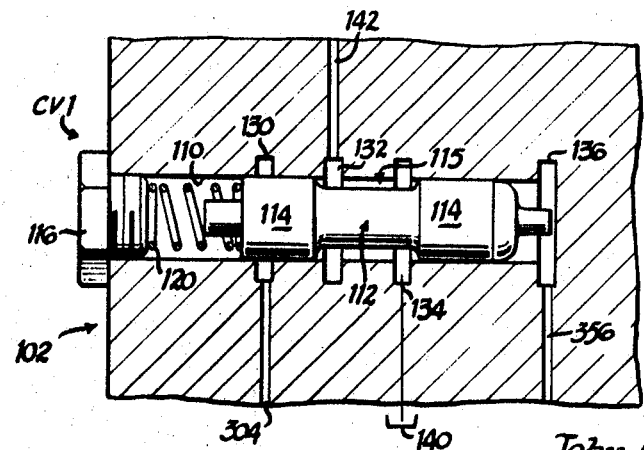
Figure 2:
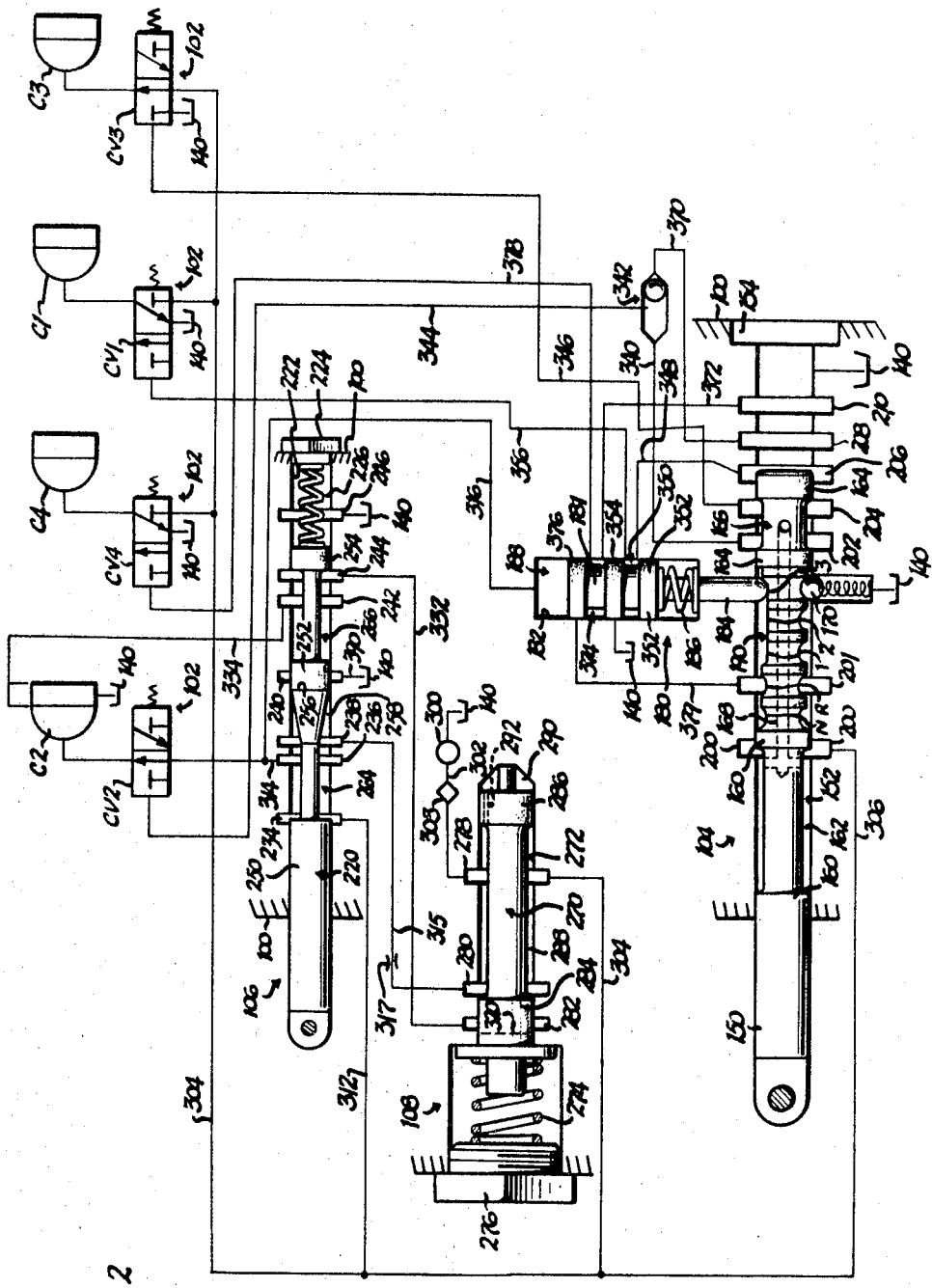

Other objects and advantages will become apparent in the following specification and the accompanying drawings wherein, FIGURE 1 is a schematic view of a transmission which may be controlled by the control valve grouping of the present invention;

FIGURE 2 is a schematic view of the hydraulic control valve grouping for the planetary gear drive unit; and FIGURE 3 is a cross sectional view of an exemplary control valve for each of the clutches.

With particular reference to the drawings, FIGURE 1 generally schematically discloses a transmission comprising a planetary drive unit 20 and a slidable gear drive unit 22. The multiple speed planetary drive unit 20 includes an input shaft 24, which is driven by a power source (not shown) and an output shaft 26. A first sun gear 28 is fixedly secured to the input shaft and is in constant mesh with a first set of planetary gears 30 carried by planetary carrier 32.

A second sun gear 34 is fixedly secured to a hollow shaft 36 with the sun gear 34 being in constant mesh with a second set of planet gears 38 (only one being shown), also carried by the planetary carrier 32. A ring gear 40 is also in constant mesh with second set of planet gears 38.

The hollow shaft 36 is adapted to be fixed to the transmision housing H through a first friction device or brake C1. The planetary carrier 32 and ring gear 40 are operatively interconnected with the output shaft 26 through second and third friction devices or clutches C2 and C3, respectively. The ring gear 40 is adapted to be fixed to the housing H of the transmission through a fourth friction device or brake C4. For purposes of simplicity, only portions of the housing are represented in schematic and are commonly identified by the letter H, it being understood that the housing encloses the entire transmission including the units 20 and 22.

As will be understood to those versed in the art, each friction device is engaged by supplying fluid under pressure to a movable pressure plate (not shown) which engages the selected relatively movable elements with each other. By proper selection of a respective pair of friction devices, the output shaft 26 may be driven at any one of three forward speeds with respect to the input shaft 24 and also be driven in one reverse speed with respect to the input shaft 24.

The first forward speed is obtained by frictionally engaging friction devices C1 and C2 to fix sun gear 36 to the housing H and planetary carrier 32 to the output shaft 26 and thereby drive the output shaft 26 through the sun gear 28 and planet gears. The second or intermediate forward speed is achieved by frictionally engaging friction devices C1 and C3, which will stop rotation of shaft 36 and sun gear 34, to rotate the output shaft through ring gear 40 and the planet gears 38 about the fixed sun gear 34. The third or high speed is accomplished by frictionally engaging clutches C2 and C3 to obtain a direct drive between the input and output shafts of the planetary gearset, while the reverse speed is accomplished by frictionally engaging clutch C2 to interconnect the planetary carrier with the output shaft 26 and engagement of brake C4 to discontinue rotation of the ring gear.

The output of the planetary drive unit is operatively coupled to the sliding gear or range changing unit 22 through a gear 50 fixedly secured to the output shaft 26, which is in constant meshing engagement with gear 52 fixedly secured to a countershaft 54 of the sliding gear drive unit 22. The countershaft is rotated in the housing H and has a pair of sets of sliding gears 56 and 58 keyed thereto to rotate therewith. The sliding gear set 56 includes a pair of gears 59 and 60 adapted to be selectively meshed with gears 62 or 64 fixedly secured to an output shaft 66 of the sliding gear drive unit 22.

The output shaft 66 is rotatably journaled in the housing H with one end thereof extending through the housing to be connected in the usual manner to the wheels of the vehicle. The output shaft has a second pair of spaced gears 68 and 70 fixedly secured thereto which are adapted to be selectively in driving mesh with gears 72 or 74 of the sliding gearset 58.

Selecting shifter collars 76 and 78 may be provided on the respective gearsets 56 and 58 and each gearset may be moved axially on the countershaft 54 through suitable levers 80 and 82 pivotally carried by the housing H with their free ends in operative engagement with the respective collars 76 and 78.

As can readily be appreciated, the combined planetary drive unit and slideable gear unit are capable of driving the output shaft 66 at twelve different forward speeds and four different reverse speeds with respect to the input shaft 24, which is driven at a common speed. Although the planetary drive unit has been shown as including three forward speeds and one reverse speed, it is readily apparent that various other options may be utilized without departing from the spirit of the invention. For example, the clutch C3 may be eliminated thereby producing a planetary drive unit having one forward speed and one reverse speed.

The control system of the invention for controlling the planetary drive unit of FIGURE 1 is schematically shown in FIGURE 2. The control system or valve group includes a unitary housing 100 which has the control valves and hydraulic conduits incorporated therein. The control valve system includes a control means or valve 102 associated with each of the respective friction devices C1 through C4, a selector means or valve 104, a modulator means or valve 106 and a fluid pressure regulator means or valve 108.

Each of the control means or valves 102 are identical in construction and are designed as CV1, CV2, CV3 and CV4 for the respective friction devices C1, C2, C3 and C4. Each valve includes a bore 110 (FIGURE 3) formed in the housing 100 which slideably receives a spool 112 having a pair of spaced lands 114 disposed thereon and to form a chamber 115. Each spool is maintained within the respective bore 110 by a cap 116 threadedly received in an opening in the housing 100 with a spring 120 interposed between the inner surface of the cap 116 and the spool 112 to maintain the spool in a first position.

Each of the bores 110 is provided with a plurality of radially enlarged ports disposed longitudinally along the outer surface of the bore. The first or charging ports 130 are connected to a fluid pressure source in a manner to be described later. A second port 132 of each of the bores is operatively connected to the associated friction device of the planetary drive unit through suitable conduits 142, 144, 146 and 148 (FIGURE 1). A third or drain port 134 is connected to a common fluid sump generally shown at 140 and each bore 110 also includes a fourth or actuating port 136. Thus, in operation the control valves are of the "off-on" type to supply fluid from a source through the valve associated with each friction device.

The selector means or valve (SV) 104 includes a selector valve spool (SVS) 150 slideable in a selector valve (SVB) bore 152 extending the entire width of the housing and having one of its ends closed by a cap 154. The SVS 150 includes a pair of spaced lands 160 adjacent one end thereof forming a chamber 162 intermediate the lands and the inner surface of the SVB 152, for a purpose to be described later. A second pair of spaced lands 164 form a second chamber 166 adjacent the inner surface of the SVB 152, which is in communication with the chamber 162 through an axially extending opening 168 formed in the SVS 150, for a purpose to be described later. The SVS 150 has a plurality of detents intermediate the adjacent lands 160 and 164, which correspond to the position of the SVS in the SVB to ascertain whether the selector valve is in the neutral, reverse, first, second or third speed, designated as N, R, 1, 2 and 3. A spring biased ball 170 is adapted to be received in the detents to maintain the selector spool in a selected position.

SV 150 also has a reverse lockout valve 180 which includes a spool 181 slideable in a bore 182 in the housing 100. The spool 181 includes a downwardly projecting finger 184 which projects into the SVB 152 and is received in a recess 190 on the SVS 150. The bore 182 receives a spring 186 therein which forces the spool 181 to an upward position. During operation of the transmission, the spool 181 is normally in its most downward position as shown in FIGURE 2 through fluid pressure received in chamber 188 formed above the spool 181 in a manner to be described later.

The bore 152 of SV 104 is provided with a plurality of enlarged radially disposed ports 200, 201, 202, 204, 206, 208 and 210, for a purpose to be described later.

The modulator means or valve (MV) 106 includes a modulator valve spool (MVS) 220 slideably received in a bore (MVB) 222 formed in the housing 100 and extending the entire length thereof with one end of the bore enclosed by a suitable cap 224. The MVS is normally moved to a neutral position (as shown in FIGURE 2) by a spring 226 acting between one end of the spool and the inner end of the cap 224.

MVB 222 has a plurality of enlarged ports 234 through 246 and MVS includes a plurality of lands 250, 252, and 254, which form chambers 264 and 266, for a purpose to be described later.

The edge 256 forming one end of land 252 is considered a metering edge and the spool adjacent the metering edge is tapered as shown at 258, for a purpose to be described later.

The regulator valve (RV) 108 includes a regulator valve spool (RVS) 270 slideably received in a regulator valve bore (RVB) 272, which has an enlarged portion at one end thereof that receives a spring 274 with the spring maintained therein by a cap 276. The spring will maintain RVS 270 in the position shown in FIGURE 2, when no fluid pressure is supplied.

Radially disposed enlarged ports 278, 280 and 282 are provided on the outer surface of the RVB 272 and RVS 270 includes a pair of spaced lands 284 and 286 to form a first chamber 288 therebetween and a second chamber 290 with an opening 292 interconnecting the chambers, for a purpose to be described later.

SYSTEM FLUID SUPPLY

Pressurized fluid is pumped from the sump or supply source 140 by pump 300 through conduit 302 having a filter 303 therein into the chamber 288 formed between the lands 284 and 286 of RVS 270. The chamber 288 is connected through a conduit 304 to charging ports 130 of CV1, CV3 and CV4 associated with the friction devices C1, C3 and C4 and via branched conduit 306 to port 200 of SV 104 to supply pressurized fluid to the chamber 162 of SV 104. The charging pressure is also supplied to port 234 of MV 106 through branch conduit 312 and from port 280 of RV 108 to port 238 via conduit 315 having a restrictor 317 therein. The fluid received in chamber 264 passes through port 236 and conduit 314 to supply charging pressure to CV2. The pressurized fluid in conduit 314 will also pass through branch conduit 316 into chamber 188 of the bore 182 thereby forcing the spool 181 downwardly and the finger 184 into contacting engagement with the recess 190 formed on MVS 150.

The fluid entering chamber 162 of SV 104 passes through opening 168 into chamber 166, to supply actuating pressure to selected control valves CV1 through CV4, in a manner to be described later.

After the friction devices, chambers and conduits which are open to flow have been filled, fluid passes into chamber 290 through opening 292 of RV 108 and the pressure buildup in chamber 290 moves RVS 270 leftward to position land 284 at the dotted line position 320. Thus, all excess fluid continuously being supplied by pump 300 and not required to maintain the open circuits, mentioned above, pressurized will pass from port 282 of RV 108 through conduit 332 to port 244 and chamber 266 of MV 106. The fluid received by chamber 266 will pass through port 242 and conduit 334 to supply lubricating fluid to clutch C2.

The fluid entering chamber 162 of SV 104 passes to the actuating ports of the control valves 102 in the following manner. The port 202 formed on SVB 152 is connected through conduit 340 to one end of a two positioned shuttle valve 342. The shuttle valve 342 is in open communication with actuating port 136 of CV2 through conduit 344. The SVB port 204 is connected by conduit 346 to the actuating port of CV3 associated with clutch C3. SVB port 206 is connected via conduit 348 to a chamber 350 formed between lands 352 and 354 on the reverse lockout spool 181. The chamber 350 is in turn connected through conduit 356 to the actuating port of CV1.

SVB port 208 is connected through conduit 370 to the opposite side of shuttle valve 342 while SVB port 210 is connected through conduit 372 to a chamber 374 formed between lands 354 and 376 of the reverse lockout spool 181. The chamber 374 in turn is in communication with the actuating port of CV4 through conduit 378. Also, SVB port 201 has a conduit 379 in communication with reverse lockout bore 182 which is blocked by land 376 when the chamber 188 is pressurized.

Thus, as shown in FIGURE 2, actuating pressure is supplied to two control valves 102 for any selected speed and the actuating ports of the remaining two control valves are drained to sump through SVB 152. In the illustrated position, SV 104 is in the third forward speed with valves CV2 and CV3 actuated through pressurized fluid in conduits 344 and 346 while the actuating ports of CV1 and CV4 are drained to sump 140.

In the illustrated embodiment, SVS 150 is moved by a lever 400 (FIGURE 1) pivotally connected to the spool at one end and to the tractor housing T immediate the ends thereof. MVS 220 is pivotally connected at 402 to manually operable means, such as a foot pedal 404, pivoted to the tractor housing T. An extension 406 is provided on the SVS 150 which is disposed in the path of an extension 408 carried by the lever 404 so that, when MVS is depressed, SVS will automatically move to the first speed position, for a purpose to be described hereinafter.

OPERATION

In operation, the modulating valve spool 220 is completely depressed by forcing the foot operated lever 404 to the right as viewed in FIGURE 1. This will automatically move SVS 150 to the first or low forward speed of the planetary drive unit. The pump 300 is actuated to supply pressurized fluid to chamber 288 of RV 108 and pass from chamber 288 to the charging ports 130 of CV1, CV3 and CV4 associated with friction-devices C1, C3 and C4. At the same time, the chamber 162 of SV is pressurized and fluid is passed through the opening 168 into the chamber 166 and thence from chamber 166 to conduits 370 and 348, respectively connected to the ports 208 and 206 on SVB 152 to actuating ports 136 of CV1 and CV2.

However, at this time the planetary drive unit is not engaged because MVS 220 is completely depressed blocking port 234 and placing ports 236 and 238 in communication with sump 140 through port 240. Since the clutch C2 must be engaged in the first forward and reverse speed the planetary gear remains in the neutral condition at this point. It should be noted that the selector spool will not move to the reverse position because the upper end of the lever 400 is guided in a slot (not shown) in the tractor housing which has an offset portion so that the lever 400 must be moved transversely to obtain the reverse position. Also, the reverse lockout chamber is not pressurized and brake C4 is engaged through fluid pressure from conduit 379 via chamber 374 to conduit 378 and port 136 of CV4.

Restriction of the flow through conduit 315 by restrictor 317 will cause a rapid buildup of pressure in chambers 288 and 290 of MV 106 to a predetermined charging pressure. By proper selection of the restrictor 317 a charging pressure of, for example, 180 p.s.i. may be maintained in chamber 288 and the excess fluid from conduit 390 to sump or fluid supply 140 and the restrictor 317 will limit the amount of flow through conduit 315. However, the fluid from the pump will be directed through port 282 and conduit 332 to port 246 and sump 140 since MVS is completely depressed. Once this condition has been reached, the foot pedal 404 is slowly released thereby allowing MVS to move to the left (FIGURE 2) by the action of the spring 226. As MVS is moving toward the left, the metering edge 256 moves toward the left and an orifice is formed between the inner surface of MVB and the outer surface of the tapered or conical surface 258 adjacent the metering edge 256. This will slowly increase the pressure in the chamber 264 with the pressure increase being restricted by restrictor 317 thereby increasing the pressure in the conduit 314 to the charging port 132 of CV2. The increasing pressure will also pass to the chamber 188 through conduit 316 and force the reverse lockout spool 181 downwardly, which will place the conduit 372 in communication with the chamber 374 to disengage brake C4. Movement of MVS to the left will also simultaneously block port 246 and cause the flow of fluid through conduit 334 to provide lubrication flow for brake C4.

Continued outward movement of MVS 220 will slowly decrease the size of the orifice, referred to above, and eventually the metering edge 256 will pass leftwardly beyond the port 240 to thereby completely pressurize the line 314 connected to the charging port 134 of CV2. The combined action described above will progressively increase the frictional engagement of clutch C2 by increasing the pressure in conduit 314 until it is completely engaged, which will produce a smooth starting action of the vehicle, and the planetary unit will be operating in the first forward speed. When the MVS is completely engaged, charging pressure will be available to clutch C2 through line 312 and port 234.

The planetary drive unit may thereafter be moved or shifted to the second or third gear by appropriate movement of the lever 400. Movement to the second forward position will move the chamber 166 into communication with the ports 204 and 206 respectively connected to the control ports of CV1 and CV3 while the ports 202, 208 and 210 will be draining the sump 140. This will move the respective spools of control valves CV1 and CV3 to the active position supplying pressurized fluid from lines 304 to the respective friction devices C1 and C3 through conduits 142 and 146.

Of course, movement of the selector valve spool to the third forward speed position will place the chamber 166 in communication with ports 202 and 204 and the ports 206, 208 and 210 on SVB 152 in communication with sump 140. The fluid pressure received in port 204 will pass via line 346 into the actuating CV3 port to thereby supply fluid pressure from conduit 304 through conduit 146 to clutch C3. At the same time the fluid received in the port 202 will pass via conduit 340 to shuttle valve 342 and conduit 344 to actuate CV2 connected to clutch C2 thereby providing charging pressure fluid through conduit 144 to clutch C2.

Whenever it is desired to reduce the speed of the vehicle, the foot lever 404 is depressed to block port 234 on MVB 222. This movement will simultaneously place chamber 264 and port 236 in communication with sump 140 through conduit 390 and reduce the pressure in chamber 264 and conduit 314 to zero, which will disengage clutch C2. Reduction of the pressure in conduits 314 and 316 will allow the spring 186 to move the reverse lockout spool 181 upwardly by the force of spring 186. This will disengage friction device C1 because conduit 356 will now be in open communication with sump 140. Also, the friction device C4 will be engaged through conduit 379, chamber 374 and conduit 378 since SVS 150 must be in the first forward speed position. Engagement of C4 will fix ring gear 40 to housing H to provide opposed frictional forces between the discs of C2 and C3 to stop the planetary output shaft 26 and allow shifting of the sliding gear unit 22.

It should be noted that full depression of MVS 220 will not affect the level of the charging pressure in chamber 288 since the restrictor will limit the flow in conduit 315 and the excessive fluid being pumped to chamber 266 is dumped to sump 140 through return port 246. This will maintain a charging pressure to the control valve of each of the remaining clutches except clutch C2 which will fall to zero or to the desired operating pressure for "inching" or moving the vehicle slowly, in either the first forward or reverse speed. Also, by blocking the port 234 of MV 106 and restricting the flow to port 238, partial engagement of the clutch can be predicted by the approximate position of the foot pedal.

The control valve assembly of the present invention, which controls the planetary drive unit, can at any time be inactivated to stop the planetary drive irrespective of the gear setting of the manually operated transmission unit. It will readily be apparent from the foregoing that a relatively simple control system has been provided for accurately controlling a complex transmission unit.

It is readily apparent that the above description is for purposes of illustration only and many modifications and alterations of the disclosed embodiment may appear to those skilled in the art. Therefore, the foregoing description is to be considered exemplary rather than limiting, and the true scope of the invention is that defined by the following claims.

I claim:

1. In a variable speed transmission having a plurality of fluid operated friction devices, a source of fluid pressure, and means operatively connecting each friction device to said source, the improvements of an off-on control valve disposed intermediate each of said friction devices and said fluid source, respectively, a selector valve having a supply port connected to said source, means for moving said selector valve to a plurality of positions corresponding to a plurality of forward speeds and at least one reverse speed to selectively connect said supply port to the control valve of each of said friction devices respectively, a modulating valve operatively interposed between said source and one of said friction devices to regulate the flow to said one friction device, and means operatively interconnecting said selector valve and said modulating valve to move the selector valve to the lowest of said forward speeds upon actuation of said modulating valve.

2. In a transmission as defined in claim 1, the further improvement of said selector valve including a bore and a spool slidable in said bore, and lockout means for preventing an accidental shift into reverse comprising a lockout spool slidable in a bore and having engageable means slidable in a recess in said selector valve spool, resilient means normally urging said lockout spool away from said recess, and passage means connecting said bore of said lockout means to said pressure source to selectively force said engageable means into said slot.

3. A transmission as defined in claim 1, in which at least two friction devices are engaged for each of said speeds and said modulating valve includes (1) a first position wherein all the fluid directed to said one friction device is passed through the associated control valve to said one friction device and (2) a second position wherein no fluid is directed to said one friction device and means for engaging one of the friction devices when said modulating valve is moved to the second position to brake the transmission.

4. A transmission as defined in claim 1, in which said supply port is connected to two control valves in each of said positions to engage two friction devices for each speed of the transmission.

5. A transmission as defined in claim 1, including at least three fluid operated friction devices, two of which are operatively engaged for each of two speeds, with said modulating valve operatively associated with the conduit connected to said friction device engaged at both of said speeds.

6. A transmission as defined in claim 5, further including a fourth friction-device to produce three forward and one reverse speed, said modulating valve being disposed between the fluid pressure source and the control valve operatively connected to the friction-device which is in engagement in the first forward and reverse speed.

7. A transmission as defined in claim 5, wherein said modulating valve includes a modulating valve bore, first, second and third ports communicating with said modulating valve bore, said first port communicating with said pressure source, said second port in communication with said control valve associated with said friction device engaged at both of said speeds and said third port in communication with an exhaust means, and a modulating spool slidably received in said modulating valve, said modulating spool having a pair of spaced lands defining a chamber between spaced adjacent lands and said valve bore with said chamber interconnecting said first and second ports when said modulating valve spool is in a first position while one of said lands blocks said third port, said modulating valve spool being movable to a second position wherein said second and third ports are in open communication and fluid supplied from said pressure source through said first port is blocked by one of said lands.

8. A transmission as defined in claim 7, wherein said control system further includes a second pressure source, means connecting said second pressure source to the modulating valve through said chamber and means defining an orifice between said modulating valve bore and spool, said orifice means being adapted to vary the communication between said exhaust means and said chamber when said modulating spool is moved between the two positions.

9. A transmission control including a fluid pressure engaged friction device, a source of pressured fluid, means interconnecting said source and said friction device, a modulating valve interposed between said source of pressured fluid and said friction device, said valve having a valve spool slidable in a bore with said spool having at least one land and a tapered member extending from one edge of said land, manual means fixed to said spool for moving said spool between (1) a first position wherein all the fluid is directed to said friction device to engage the same, (2) a second position wherein all said fluid is directed away from said friction device so that the friction device is disengaged, and (3) a plurality of positions intermediate said first and second positions wherein the amount of fluid directed to said friction device is regulated by said tapered members whereby the extent of friction device engagement may be accurately regulated between said first and second position, means for lubricating said friction device comprising a third pressure source communicating with said bore and means connecting said bore to said friction device with said valve providing free lubrication flow when said spool is in the first position and in any one of the plurality of positions and directing the flow away from said friction device when the spool is in the second position.

10. A transmission control as defined in claim 9, in which said means interconnecting said source and said friction device includes means for providing substantially free flow to said friction device when said spool is in the first position and restricting flow when said spool is in any other position.

11. A transmission control as defined in claim 9, further including a control valve disposed between said modulating valve and said friction device and having a first position wherein the fluid directed to said friction device is blocked at the control valve and a second position providing free flow between said modulating valve and friction device.

12. In a transmission having a plurality of forward speeds and at least one reverse speed respectively engaged through selective actuation of a plurality of fluid operated friction devices, a source of fluid pressure, and a control system including a selector valve having a plurality of positions to connect said source to selected friction devices for obtaining each of said speeds, the improvement comprising a manually operated member between one of said friction devices and said source for controlling flow of pressured fluid to said one of said friction devices and having a first position wherein said pressured fluid is directed to said one friction device and a second position wherein said pressured fluid is directed away from said one friction device to disengage said one friction device, manual means for moving said member between said first and second positions, and means operatively connecting one of said member and said manual means with said selector valve for moving said selector valve to the position corresponding to lowest of said forward speeds when said member is moved from the first to the second position whereby said transmission is neutralized when said member is moved to said second position and rendered effective for said lowest forward speed as said member is returned to said first position.

13. A transmission as defined in claim 12, wherein said member includes a plurality of positions intermediate said first and second positions and said member includes a second means defining a variable orifice for regulating the extent of friction device engagement of said one friction device by regulating the fluid flow directed to said friction device when said member is moved to any one of the intermediate positions.

14. In a transmission as defined in claim 12, and wherein said transmission includes a reverse speed with two of said friction devices engaged for each speed, the further improvement of said one friction device being engaged for both the low forward and reverse speeds.

15. In a transmission having a plurality of forward speeds engaged through selective actuation of a plurality of fluid operated friction devices, a source of fluid pressure, and a control system including a selector valve having a plurality of positions for selectively connecting said source to said friction devices, the improvement comprising:

a modulating valve interposed between said source and one of said friction devices and engaged for the lowest of said forward speeds, a manually operated member operatively connected to said modulating valve for moving said valve between a first position wherein said source is connected to said one of said friction devices and a second position wherein said source is directed away from said one of said friction devices and disengaging said one of said friction devices and means carried by said member for moving said selector valve to a position corresponding to the lowest of said forward speeds when said modulating valve is moved to the second position, whereby said transmission is conditioned for operation in the lowest of the forward speeds as said modulating valve is returned from the second position to the first position.

References Cited

UNITED STATES PATENTS

| | | | |
|---|---|---|---|
| 2,861,480 | 11/1958 | Curtis | 74—732 |
| 2,972,906 | 2/1961 | Schroeder | 192—4 X |
| 3,025,723 | 3/1962 | Miller | 74—732 |
| 3,060,896 | 10/1962 | McIntyre | 91—434 |
| 3,078,736 | 2/1963 | Meads et al. | 74—869 |
| 3,083,801 | 4/1963 | Frohner | 192—3.5 |
| 3,298,252 | 1/1967 | Harris et al. | 74—761 |
| 3,378,119 | 4/1968 | Schaefer | 192—4 |
| 2,749,772 | 6/1956 | O'Malley. | |
| 2,809,536 | 10/1957 | O'Malley. | |
| 2,978,928 | 4/1961 | Tuck et al. | |
| 3,017,788 | 1/1962 | Polomski. | |
| 3,023,636 | 3/1962 | Kelley et al. | |
| 3,039,327 | 6/1962 | Breting. | |
| 3,050,164 | 8/1962 | Bowen et al. | |
| 3,080,764 | 3/1963 | Miller et al. | |
| 3,138,969 | 6/1964 | Fisher et al. | |
| 3,207,182 | 9/1965 | Edmunds. | |
| 3,251,246 | 5/1966 | Foerster et al. | |

DONLEY J. STOCKING, Primary Examiner

THOMAS C. PERRY, Assistant Examiner

U.S. Cl. X.R.

74—364, 740; 192—4, 109